United States Patent Office 3,447,390
Patented June 3, 1969

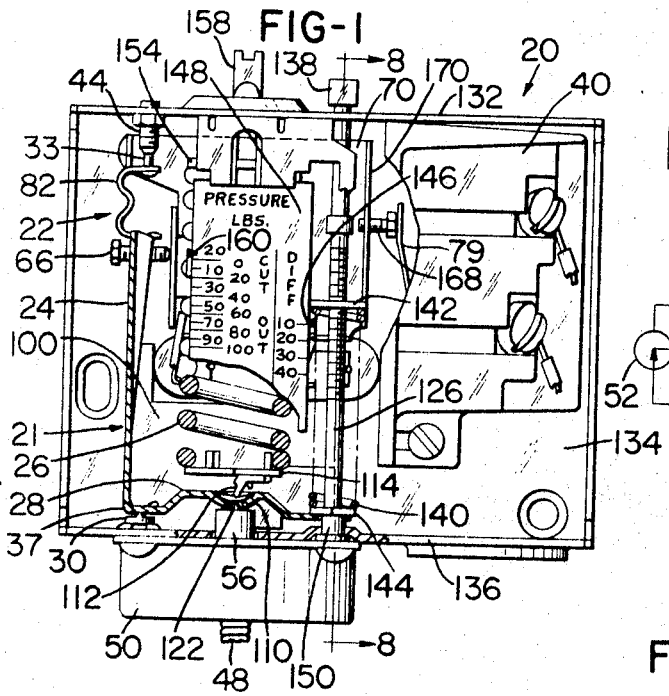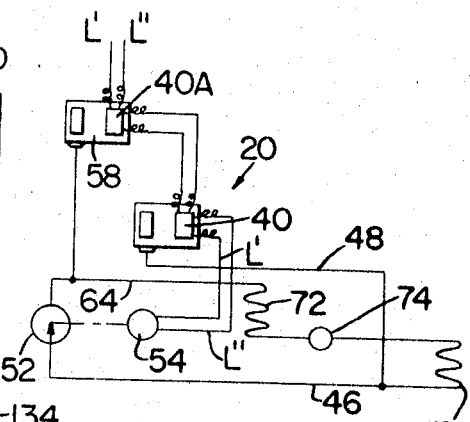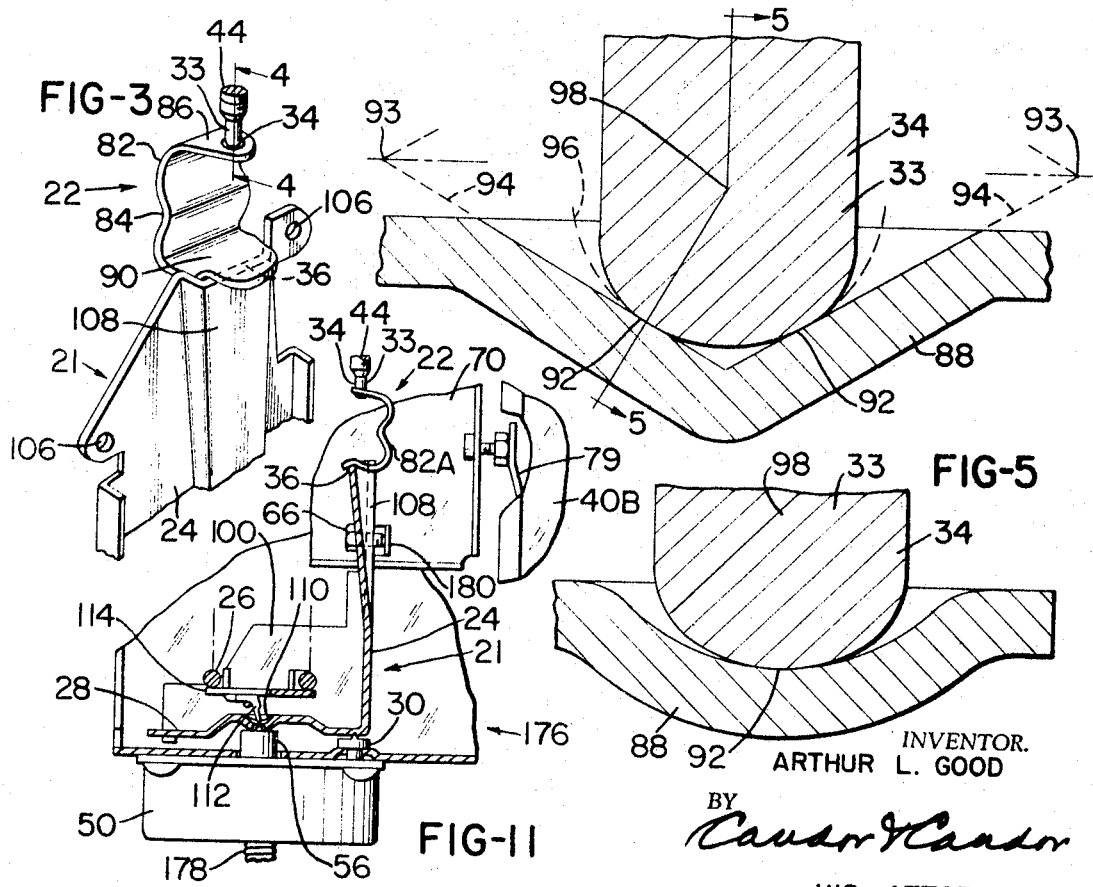

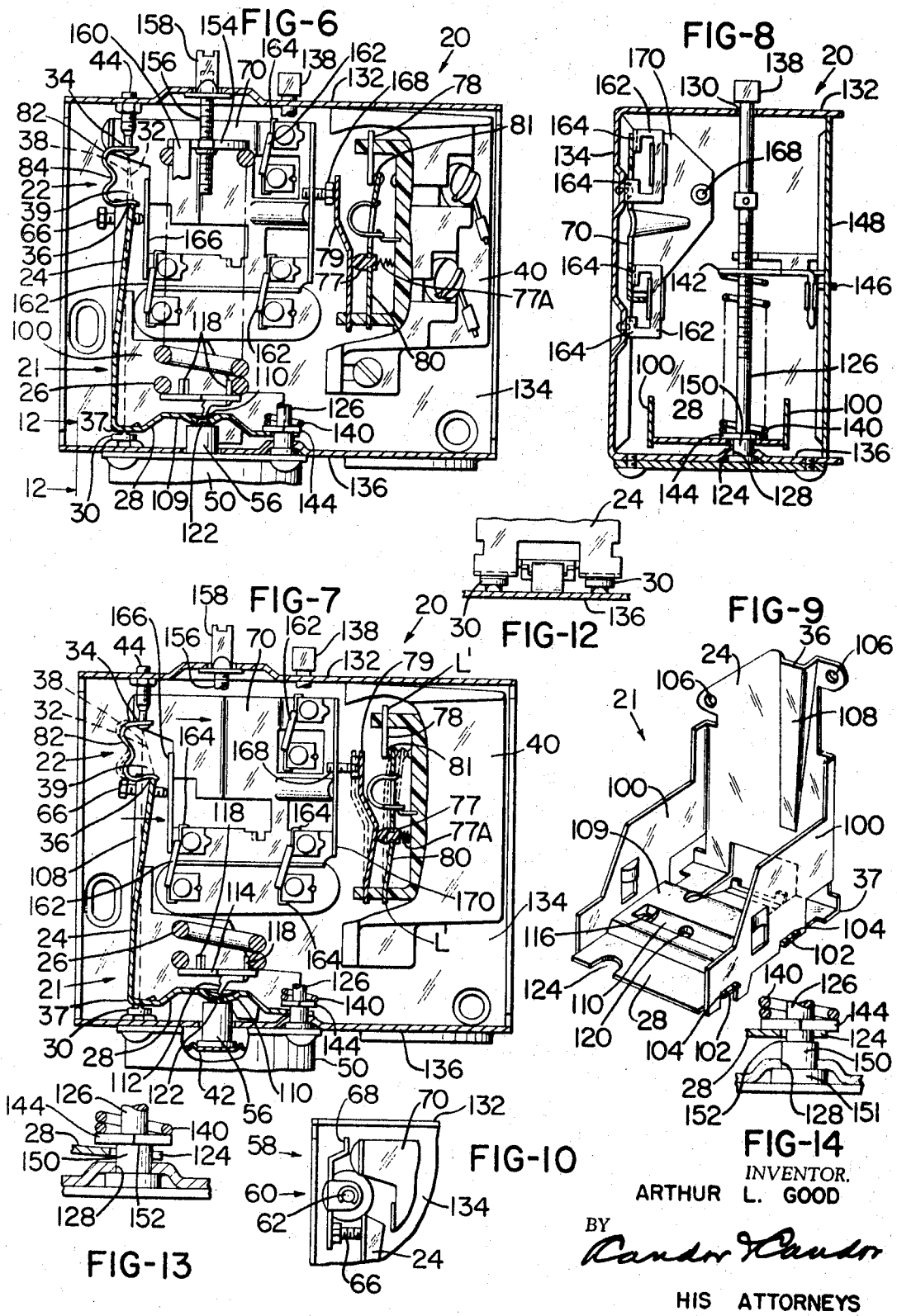

3,447,390
NEGATING SPRING CONSTRUCTION FOR A PRESSURE REGULATOR AND THE LIKE
Arthur L. Good, Elkhart, Ind., assignor to Robertshaw Controls Company, Richmond, Va., a corporation of Delaware
Filed Dec. 6, 1966, Ser. No. 599,514
Int. Cl. F16h 21/44
U.S. Cl. 74—100                    17 Claims

ABSTRACT OF THE DISCLOSURE

This invention relates to a pressure regulator and the like which is provided with a negating spring construction. Such negating spring construction varies the spring rate of the range spring, so that the regulator can be responsive to entirely different on and off pressure ranges from those of the regulator without such negating spring construction.

The negating spring may be a bowed compression spring that is applied to an arm lever of the controller so that a varying angular force is applied to the lever as such lever rocks in response to pressures to be regulated.

---

This invention relates to a pressure regulator and the like.

The regulator is provided with a negating spring construction which varies the spring rate of the range spring of the regulator to make the regulator responsive to pressure to which it previously was not responsive.

The negating spring construction may include a compression negating spring that is applied at an angle to a pressure responsive lever in a manner so that such angle varies as the lever rocks in response to pressures to be regulated.

The negating spring may be a bowed compression spring that is applied at a slight angle to the effective length of the pressure responsive lever so that such angle increases and decreases as such lever rocks in response to the pressures to be regulated.

Other features are apparent from this description, the appended claimed subject matter, and/or the accompanying drawings, in which:

FIGURE 1 is a diagrammatic vertical cross section, partly in elevation, of a pressure regulator using a negating spring construction of this invention.

FIGURE 2 is a diagrammatic view of a refrigeration system with which the pressure regulator of FIGURE 1 may be used, and with which the pressure regulator of FIGURE 10 may also be used.

FIGURE 3 is a diagrammatic perspective view, in enlarged scale, of the negating spring construction shown in FIGURE 1.

FIGURE 4 is an enlarged cross section of the upper fulcrum construction of the negating spring shown in FIGURE 3, the cross section being taken along the line 4—4 of FIGURE 3.

FIGURE 5 is a substantially transverse cross section of FIGURE 4, taken along the line 5—5 of FIGURE 4.

FIGURE 6 is a cross section somewhat similar to FIGURE 1, but omitting parts of the elevation shown in FIGURE 1.

FIGURE 7 is a view similar to FIGURE 6, but showing the lower end of the negating spring, and the upper end of the vertical lever moved rightwardly from the position of FIGURE 6 in response to the reduction of the low side pressure of the refrigeration system of FIGURE 2.

FIGURE 8 is a vertical cross section taken along the line 8—8 of FIGURE 1.

FIGURE 9 is a perspective view of the arm construction used in the pressure regulator of FIGURE 1, and 3–8.

FIGURE 10 is a diagrammatic cross section showing a reversing lever construction being used instead of the negating spring construction shown in FIGURES 1, and 3–8, to change the low side regulator of FIGURES 1, and 3–8 to a high side regulator for the refrigeration system.

FIGURE 11 is a diagrammatic cross section showing an arm construction with the fulcrum on the right side and with the negating spring leftwardly moving at its lower end.

FIGURE 12 is a diagrammatic cross section of certain parts taken along the line 12—12 of FIGURE 6.

FIGURE 13 is a diagrammatic view showing the "cut out" positions of the horizontal lever and lower end of the differential spring.

FIGURE 14 is a view similar to FIGURE 13, but showing the "cut in" positions of such lever and spring.

Certain words may be used in this specification and in the claimed subject matter indicating direction, relative position and the like. Such words are used for the sake of brevity and clearness. However, it is to be understood that such words are used in connection with the illustrations in the drawings, and that in actual use, the devices, parts and the like which are described by such words may have entirely different direction, relative position and the like.

The pressure and/or temperature regulator 20, shown in FIGURES 1, and 3–8 may be used to be responsive to the low side of a refrigeration system, such as the one shown in FIGURE 2.

The regulator 20 may have one or more L-shaped rocker arms or rocker arm constructions 21, FIGURE 9.

Such regulator 20 may have a compression negating spring means or construction 22 which may apply a downward spring load to the substantially vertical arm lever 24, while a compression range spring 26 imparts a downward spring load or downward pushing action on the substantially horizontal arm lever 28.

The downward spring load of the negating spring 22 is applied to the vertical lever 24 slightly to the right of the common arm fulcrum means or fulcrums 30, FIGURE 6, as indicated by the imaginary negating spring fulcrum line 32 which extends from the upper negating spring fulcrum 34 and the lower negating spring fulcrum 36.

The imaginary negating spring fulcrum line 32 forms a variable angle 39 with another imaginary arm and negating spring fulcrum line 38 extending between the upper negating spring fulcrum 34 and the common arm fulcrum 30.

Therefore, the substantially downward spring load of the negating spring 22 on the vertical lever 24 has a substantially horizontal component which acts sidewise on the vertical lever to impart a rightward or clockwise torque about the fulcrum 30 on the vertical lever 24. This clockwise torque is also imparted to the horizontal arm lever 28 through the rigid lever connection 37 to produce a downward torque in the horizontal lever 28.

FIGURES 1, 6 and 7 illustrate a gradual clockwise movement in the arm levers 24 and 28 which produces a gradually increasing angle 39 between the imaginary negating spring fulcrum line 32 and the arm and negating spring fulcrum line 38. Because of the increasing size of the angle 39 the horizontal component of the negating spring load increases materially from FIGURE 1 to FIGURE 7. Such increase of the horizontal component is substantially proportional to the sine of such angle 39.

Such increasing lateral force component on vertical lever 24 is transmitted by the rigid lever connection 37 into a corresponding increasing downward force component on the horizontal lever 26.

This downward force from the negating spring 22 on the horizontal lever 28 has the net effect of reducing or negating the spring rate of the rate of the range spring 26.

In view of this it is possible to obtain a fixed on and off switch actuation of the switch 40 with an operating force in the bellows or diaphragm 42 less than which would be required without such negating spring 22. This is accomplished by adding the diminishing force of the negating spring 22 to the increasing force caused by the range spring 26 and diaphragm deflection obtained by an increase in the sensing pressure in the diaphragm and vice versa. The diminishing force is obtained by a decrease in the resultant force from a change in the sine of the force angle 39 above described.

By changing the spring rate of the negating spring 22, it is possible to make a controller responsive to many different sensing pressures as may be required by refrigerating system manufacturers and the like.

Such change in the spring rate of the negating spring 22 may be obtained by adjusting the length between the fulcrums 34 and 36, such as by upwardly or downwardly adjusting the lower fulcrum end 33 of the fulcrum screw 44. Alternatively, such change in the spring rate of the negating spring 22, may be obtained by using a negating spring of stronger or weaker material.

The interior of the bellows 42 of the pressure regulator 20 may be connected to any variable pressure source, such as to any desired part of a refrigeration system, such as the one shown in FIGURE 2. For example, such bellows or pressure transmitting member 42 may be connected to the low side, or expanded refrigerant line or conduit 46 by a connecting line or conduit 48 which extends out of the bellows casing 50.

The pressure in the low side refrigerant line 46 rises and falls, as is usual in refrigerating systems, mainly in response to the starting and stopping of the refrigerant compressor 52 and its driving electric motor 54.

While the motor and compressor run or operate, the refrigerant pressure in line 46 falls and pulls the bellows or diaphragm 42 downwardly along with its lever actuating plunger 56. The horizontal lever 28 follows the downward motion of the plunger 56, under the downward forces of the springs 22 and 26, through the positions of FIGURES 1, 6 and 7. FIGURE 7 shows the position just prior to the snap actuation of the switch 40 to the open position which is shown in dotted lines in FIGURE 7. The opening of the switch 40 stops the motor 54 and compressor 52, at the "cut out" pressure of the refrigerant line 46.

Thereafter, the refrigerant pressure in the line 46 starts to increase to cause a reversal of motion of the bellows 42, plunger 56, levers 24, 28, etc., until the pressure in refrigerant line 46 reaches the "cut in" pressure which causes the switch or energy controller 40 to snap to "on" position. This starts operation of the motor 54 and compressor 52 to repeat the cycle of operation of the refrigerant system until it again reaches the "cut out" pressure condition.

Manufacturers and/or users of refrigeration systems, or other variable pressure and/or temperature systems may require pressure responsive controllers, such as controller 20, with widely different "on" and "off" pressure conditions. With the use of the negating spring means of this invention, it is possible to vary the responsiveness of the controller 20 to meet many of such widely different requirements without costly change in the other components of the controller. A change in the spring rate of the negating spring 22, as previously described, may be sufficient to meet many of such requirements of the manufacturers or users of the systems.

Another advantage of the negating spring means of this invention is that a low pressure side controller 20 such as shown in FIGURES 1, 6 and 7 may be changed to a high pressure side controller, such as high pressure side controller 58. Such controller 58 may be made by substituting the reversing lever 60 of FIGURE 10 for the negating spring 22 of FIGURES 1, 6 and 7. The reversing lever 60 is rotatably fulcrumed on a stationary fulcrum shaft 62 so that the vertical lever 24 opens the switch 40A, FIGURE 2, when the pressure in the high side refrigerant line 64 reaches a maximum "cut out" pressure at which it is desired to stop operation of the compressor 52.

The lower end reversing lever is moved leftwardly by the actuating screw 66 to cause the upper lever end 68 to move the switch actuating shuttle 70 rightwardly to open the switch 40A when such high side refrigerant line 64 reaches such maximum "cut out" pressure. The switch 40A may be identical to the switch 40 of FIGURES 1, 6 and 7, and the levers 24 and 26, and other parts of the controller 20 may remain substantially identical to form the remainder of the high side controller 58.

The switches 40 and 40A in FIGURE 2 may be connected in electrical series condition so that both switches 40 and 40A must be closed to energize the motor 54 and operate the compressor 52. Either of the switches 40 or 40A, when opened, can stop the motor 54 and compressor 52, as is obvious.

Other parts of the refrigerating system of FIGURE 2 may include a refrigerant condenser 72, refrigerant expansion means or valve 74, and refrigerant evaporator 76. The electrical line L' may pass through each stationary contact 78 and each snap blade 80 of the switches 40 and 40A and may then be connected to the motor 54. The snap blade 80, with its well known C-spring snaps the movable contact 81 against and away from the stationary contact 78 to close and open the electrical line L'.

The switches 40 and 40A may be of any well known snap switch construction. Such switches may be actuated by movement of a leftwardly biased actuating blade 79 which moves the snap blade 80 by means of an insulating button 77 which is leftwardly biased by the compression spring 77A in a well known manner.

The electrical line L" may be connected directly to the motor 54 without passing through the switches 40 and 40A in a well known manner, not illustrated. Alternatively such line L" may pass through the switches 40 and 40A without being opened, or being opened by well known double pole construction. Three phase current, etc., may be correspondingly controlled by well known variation of the switch 40, per se.

In view of the similarity of the controllers 20 and 58 it is obvious that the negating spring construction 22 of the controller 20 of FIGURES 1, 6 and 7 can be advantageously revised by the substitution of the reversing lever construction 60 of FIGURE 10 to produce the high side controller 58 of FIGURE 2, as shown in FIGURE 10.

*Further details*

Two fulcrum members 30 may be provided, with one each engaging side edges of the horizontal lever 28 as shown in partly elevation and partly in cross section in FIGURE 12. The fulcrum members 30 each has an upward ridge and the horizontal arm 28 has corresponding grooves at its edges rockingly to receive the ridges. This is more fully described in applicant's copending application Ser. No. 599,515, filed Dec. 6, 1966, for pressure temperature regulator.

The negating spring means 22 may include a bowed compression negating spring 82, FIGURE 3, with a reverse bend 84 at its center, if desired. The spring 82 has an upper portion or end 86, FIGURES 3, 4 and 5, which may have an upper negating spring fulcrum end construction 88, FIGURES 4 and 5 which engages the stationary negating spring upper fulcrum 33 of the adjustable fulcrum screw 44 adjacent the upper end of the vertical lever 24.

A lower negating spring end 90, FIGURE 3, curls over and engages the rocking lower negating spring fulcrum 36 on the vertical lever 24 to produce a downward pressing action with a horizontal component or resulting horizontal pressing action on the vertical lever to produce a downward torque in the horizontal lever 28 as previously described.

The fulcrum end construction 88, FIGURES 4 and 5, has a universal rocking surface construction 92 that includes portions of two aligned horizontal cones 94 which have their apexes at 93 and which generate the surface construction 92. The negating spring upper fulcrum 33 at the lower end of screw 34, FIGURES 4 and 5, has a surface which is part of a sphere 96 which has its radius center at 98. The surfaces 92 and 98 can rock universally in any direction about the spherical end 33 of the screw 34 without imparting any dimensional shift which can cause a force change that will shift the range and differential settings. The intersection of the two conical surfaces 92 provide a space where common end imperfections on the screw 34 and do not become effective in rolling action between the two components.

The rocker arm 21, or rocker arm construction, is shown in perspective in FIGURE 9, and in side view in FIGURES 1, 6 and 7. This rocker arm construction may be used in all of the embodiments herein disclosed. It may be formed from a single blank by bending processes, as is obvious from FIGURE 9. It has the horizontal arm lever 28, the vertical arm lever 24, and has an elbow joint construction 37, homogeneously joining the horizontal arm lever 28, and the vertical arm lever 24. A pair of side braces 100 are integral or homogeneous with the vertical arm lever 24 and are rigidly secured to the horizontal arm lever 28 by means of the tongues 102 which are staked or welded securely in the notches 104 in the side braces 100.

The upper end of the vertical lever 24, FIGURES 3 and 9, has openings 106 for the selective reception of adjustable screws 66 which may be any of the screws shown in the figures to engage any of the shuttle members 70 and the like in all of the embodiments as well as the reversing lever 60 of FIGURE 10.

The vertical arm 24 has a slanting channel 108, the top end 36 of which is adapted to be the lower fulcrum point for the negating spring 82, in FIGURES 3 and 9. The top end 36 is properly rounded or otherwise finished properly to rock the lower end 90 of the negating spring 82.

The horizontal lever 28, FIGURES 1, 6, 7, 9, etc., has several features that are not directly material to this invention. These features are described and claimed in applicant's copending application.

The horizontal lever 28 has a raised platform 109, FIGURES 6 and 9, in which a rocker groove 110 is formed to receive a downward rocker lip 112 of a spring end receiver plate 114. The groove 110 is gently curved in its central part, FIGURES 6 and 9, and has relatively sharp bottomed higher fulcrum ditches 116 at each end of groove 110, which receive both ends of the downward lip 112, to transfer a relatively sharp equally distant spring stress at each side of the horizontal lever 28.

The spring end receiver plate 114, FIGURES 1, 6 and 7, has several upward flanges 118 cut and bent upwardly from the plate 114.

The rocker groove 110 has an opening 120, in which the actuating means 56 of any of the bellows or diaphragm constructions may engage the horizontal lever 28. For this purpose, the actuator means 56 may be provided with a nipple 122 to engage the opening 120.

The end of the horizontal lever 28 may have a notch 124, FIGURE 9, to permit a threaded rod 126, FIGURES 1, 6, 7, 8, 13, 14, to pass upwardly from the opening 128, FIGURES 1, 8, 14 etc., such rod extending upwardly through the controller 20 of FIGURES 16, 7 and 8 and loosely through opening 130 in top wall 132 of the frame which also includes a rear wall 134 and a bottom wall 136. The upper end of rod 126 may have a square cross-sectioned head 138 for turning by a wrench or knob, not shown. The rod 126 may be surrounded by a differential spring 140 which engages an upper threaded flat plate or nut 142 and a lower loosely encircling plate or washer 144. This plate 142 has a pointer construction 146, FIGURES 1 and 8, to indicate the differential setting on the indicator front plate scale 148.

In the embodiment including FIGURES 1, 6, 7, 8, 9 and 12–14 the differential spring 140 is one of the factors which determines the difference in pressure in the bellows 42 between the "cut in" and "cut out" pressures, at which the switch 40 is opened and closed. In this embodiment, such spring 140 does not determine the "cut out" pressure, but does determine the "cut in" pressure by vertical adjustment of the upper spring end plate 142 which can be adjusted by turning the screw threaded rod 126. The plate 142 is prevented from turning by the pointer construction 146, which indicates the pressure differential on the scale plate 148.

The rod 126 has a larger diameter portion 150 with a lower flange 151 and an upper shoulder 152 that receives the lower differential spring washer 144 and stops the downward travel of the washer 144 and lower end of differential spring 140 before the horizontal lever 28 reaches the "cut out" position as shown in FIGURES 7 and 13.

The spring load of range spring 26 is adjusted by the internally threaded upper range plate 154 which is vertically adjustable by rotation of range adjusting screw 156 by a knob, not shown, at the upper square head 158 of such screw. The range plate 154 is prevented from turning by the pointer construction 160 which has an indicative pointer which indicates the cut out pressure on the indicator plate at which the bellows 42 will open the switch 40. The lower end of the range spring 26 acts on the pivot plate 114 which has the pivot blade 112 which pivots on and pushes down on the horizontal lever 28.

At the "cut out" position, just lower than FIGURES 7 and 13, only the range spring 26 and the strong force of the large angle 39 of the negating spring 82 in FIGURES 7 and 13 position, act against the balancing pressure of the bellows 42 to snap the switch 40 to open position. At the "cut in," just slightly higher than the position of FIGURE 6, and as shown in FIGURE 14, the differential spring 140, the range spring 26 and the weak force of the small angle 39 of the negating spring 82 act against the balancing force of the bellows 42 at the "cut in" pressure, to snap the switch 40 to closed position.

Therefore, the range spring 26 and the large angle 39 of the negating spring 82 determine the "cut out" pressure, and the range spring 26 and the differential spring 140 with very little effect from the small angle 39 of negating spring 82 determine the "cut in" pressure. Hence adjustment or strength change of the negating spring 82 may be used to be the main influence on the "cut out" pressure, and adjustment of the differential spring 140 may be used to be the main influence on the "cut in" pressure. This permits a much wider range of "cut in" and "cut out" choices in adapting the controller to particular requirements of manufacturers and users of the controller.

The snap switches 40 and 40A of FIGURE 2 may be actuated by movement of the vertical levers 24 through the medium of the horizontally reciprocable shuttle or shuttle means 70. The shuttle 70 may be leftwardly biased and resiliently supported by the leftwardly biased leaf springs 162 which have attaching feet 164 for attaching the leaf springs 162 respectively to the rear wall 134 of the frame and to the shuttle 70. The feet 164 may be rivetted and/or welded to the wall 134 and shuttle 70 respectively, as shown in FIGURES 7 and 8.

The shuttle 70 may be actuated by an adjustable screw 66 which is adjustably threaded in one of the holes 106 of lever 24. Such screw 66 may actuate the left end flange 166 of shuttle 70, FIGURE 7. An adjustable screw 168 may be threaded into the right end flange 170 and may push and actuate the leftwardly biased actuating blade 79 of the snap switch 40 (or 40A).

As the shuttle 70 is moved rightwardly by lever 24 to a position slightly rightward of FIGURE 7, the screw 168 moves the actuating blade 79 slightly rightward of the full line position shown in FIGURE 7. This snaps the snap blade 80 rightward and moves the contact 81 rightward to open position to open line L'.

As the shuttle 70 is moved leftwardly by the lever 24, the screw 168 is moved leftwardly to allow the actuating blade 79 to move leftwardly. When the shuttle 70 reaches the "cut in" position, slightly rightward of FIGURES 1 and 6, the snap blade 80 snaps rightwardly to the closed switch position shown in FIGURE 6. FIGURE 14 shows the position of the horizontal lever 28 at such "cut in" position. The lever 28 has raised the plate 144 of the differential spring 140 so that only the range spring 26 and the slight angle 39 force of the negating spring 82 determine the "cut in" pressure of the bellows 42 that closes the switch 40. FIGURES 1 and 6 show the switch 40 closed and the horizontal lever 28 after it has moved slightly downward from its highest "cut in" position of FIGURE 14 when the switch 40 was closed.

FIGURE 11 shows a pressure responsive pressure regulator 176 in which the connecting conduit 178 may be connected to any desired part of a refrigeration system and the like, such as the high side of the refrigeration system, such as line 64. The fulcrums 30 and vertical lever 24 may be on the right side of the range spring 26. The vertical arm 24 may be moved rightwardly upon rising pressure in the line 64, so that the snap switch 40B is opened when the "cut out" pressure of the high side is reached at the maximum desired pressure. Thereafter the switch 52 is not reclosed until such time as the pressure in the high side line 64 falls to the "cut in" or reclosing pressure to which the controller is calibrated.

Other parts of the regulator 176 may be substantially the same as previously described, with reversed orientation. The screw 66 of lever 24 may engage a flange 178 on shuttle 70 to actuate the shuttle.

In FIGURE 11, the vertical arm lever 24 may be provided with a negating spring 82A of the same general nature as heretofore described, except that the "open" side of the spring 82A may be leftwardly directed. That is, the upper and lower ends of the negating spring 82A may be leftwardly directed.

The negating spring 82A in FIGURE 11 may be used when it is desired to vary the pressure differential between the "cut out" and "cut in" pressures as well as to vary the pressures to which the controller 176 is responsive.

It is thus to be seen that a new and useful negating spring construction has been provided for a pressure regulator and the like.

Reference is made to applicant's copending application for pressure or temperature regulator for further disclosure of features herein illustated and/or descibed.

What is claimed is:

1. In a negating spring construction for a pressure regulator and the like, including: a rocker arm construction having a generally vertical arm lever and a generally horizontal arm lever secured together; a common arm fulcrum means for rocking movement of said arm construction and for common rocking movement of said levers about said common arm fulcrum means; an energy controller movable to on and off snap positions by rocking movement of said arm construction; snap movement means operating said energy controller to said on and off snap positions during rocking movement of said arm construction; a generally vertical compression range spring having a lower end portion downwardly pressing said generally horizontal arm lever at a range spring rate; a pressure transmitting member upwardly pressing said generally horizontal arm lever in opposition to said downward pressing range spring; and wherein the improvement comprises a compression negating spring means independent of said snap movement means diminishing said downward range spring rate as said arm construction rocks and moves said energy controller to one of said on and off positions.

2. A negating spring construction according to claim 1, wherein said negating spring means includes a compression negating spring with an upper negating spring end engaging a stationary negating spring upper fulcrum adjacent said vertical lever, and with a lower negating spring end engaging a rocking lower negating spring fulcrum on said vertical lever, said negating spring fulcrums forming a negating spring fulcrum line, said negating spring means horizontally pressing said vertical lever to produce a downward torque in said horizontal arm in proportion substantially to the sine of an angle produced between said negating spring fulcrum line and another fulcrum line extending between said upper negating spring fulcrum and said common arm fulcrum.

3. A negating spring construction according to claim 2 in which a vertical differential spring downwardly presses on said horizontal lever.

4. A negating spring construction according to claim 3 in which said differential spring is substantially effective to aid in controlling only the other of said on and off positions.

5. A negating spring construction according to claim 4 in which said differential spring is effective to aid in controlling said on position of said energy controller.

6. A negating spring construction according to claim 2 in which said upper fulcrum has a lower end with a surface which is part of a sphere and in which said upper negating spring end has a rocking surface that has portions of two aligned horizontal cones.

7. In a negating spring construction for a pressure regulator and the like including an L-shaped rocker arm construction having a substantially horizontal arm lever and a substantially vertical arm lever rigidly secured together; a common arm fulcrum means for said arm construction for joint rocking movement of said levers about said common arm fulcrum means; a substantially vertical compression range spring having a lower spring portion exerting a downward pushing action on said horizontal arm lever at a zone spaced from said common arm fulcrum means to cause a sidewise movement of said vertical arm lever; and wherein the improvement comprises: a negating spring upper fulcrum means above said vertical lever and above said common arm fulcrum; and a negating flexible compression spring means having a lower negating spring means portion exerting a downward push on an upper portion of said vertical arm lever, and having an upper negating spring means portion engaging said negating spring upper fulcrum above said common arm fulcrum to impart an increasing negating spring means sidewise load component on said vertical arm lever while said vertical compression spring imparts a downward pushing spring load on said horizontal arm lever.

8. A negating spring construction according to claim 7 in which said negating compression spring means is a bowed compression leaf spring means.

9. A negating spring construction according to claim 7 in which said negating spring upper fulcrum means is an adjustable vertical screw with a rounded lower fulcrum screw end and in which said negating compression spring means is a bowed compression leaf spring with a lower negating spring end portion rockingly engaging a horizontal edge portion on said vertical arm lever and with an upper negating spring end portion fulcrumed on said screw end.

10. A negating spring construction according to claim 9 in which said vertical compression spring means is a coil spring with a lower end imparting said downward pushing spring load on said horizontal arm lever.

11. A negating spring construction according to claim 9 in which said negating fulcrum end has a fulcrum surface which is a part of a sphere.

12. A negating spring construction according to claim 9 in which said upper negating spring end portion has a rocking groove formed by two portions of horizontal cones.

13. A negating spring construction according to claim 12 in which said negating fulcrum end has a fulcrum surface which is a part of a sphere.

14. A negating spring construction according to claim 7 in which a snap switch is provided, and actuating means are provided for engagement by said vertical arm for actuating said snap switch, and in which an upwardly movable pressure transmitting member is provided and said horizontal lever receives upward actuation from said upwardly movable pressure transmitting member.

15. A negating spring construction according to claim 7 in which said negating spring upper fulcrum means forms a fulcrum line with said common arm fulcrum means; and said negating spring upper fulcrum means and said lower negating spring means portion form a negating spring means line which forms an angle with said fulcrum line, said angle increasing as said vertical lever rocks about said common arm fulcrum means to impart said increasing sidewise load component on said vertical arm lever.

16. A negating spring construction according to claim 15 in which said upper fulcrum means is vertically adjustable.

17. A negating spring construction according to claim 15 in which said sidewise load component increases as the sine of said angle.

References Cited

UNITED STATES PATENTS

| 1,515,843 | 11/1924 | DeVille | 92—140 X |
| 2,226,297 | 12/1940 | Spangenberg | 62—226 X |
| 2,506,694 | 5/1950 | Watson et al. | 92—40 X |
| 2,562,437 | 7/1951 | Rothwell et al. | 200—153.8 X |
| 2,691,084 | 10/1954 | Miller | 200—67 |
| 2,732,450 | 1/1956 | Stevenson | 200—82.2 |
| 2,744,748 | 5/1956 | Wiegers et al. | 267—1 |
| 2,943,458 | 7/1960 | Cohea | 62—226 X |
| 3,182,150 | 5/1965 | Smith | 200—83.91 |
| 3,354,279 | 11/1967 | Lamar | 200—153.8 X |
| 3,354,280 | 11/1967 | Slonneger | 200—83.9 X |

FOREIGN PATENTS

| 1,172,760 | 6/1964 | Germany. |

MARTIN P. SCHWADRON, *Primary Examiner.*

IRWIN C. COHEN, *Assistant Examiner.*

U.S. Cl. X.R.

74—102; 92—130, 133, 140; 200—81, 83, 153